United States Patent [19]
Choe et al.

[11] Patent Number: 5,704,339
[45] Date of Patent: Jan. 6, 1998

[54] METHOD AND APPARATUS FOR IMPROVING VEHICLE FUEL ECONOMY

[75] Inventors: Carole Marie Choe, Ann Arbor; Robert Matthew Marzonie; Michael John Cullen, both of Northville, all of Mich.

[73] Assignee: Ford Global Technologies, Inc., Dearborn, Mich.

[21] Appl. No.: 638,082

[22] Filed: Apr. 26, 1996

[51] Int. Cl.⁶ .................................................. F02D 41/14
[52] U.S. Cl. ..................................... 123/674; 60/285
[58] Field of Search ................. 123/674, 675; 60/285

[56] References Cited

U.S. PATENT DOCUMENTS

| | | | |
|---|---|---|---|
| 4,445,481 | 5/1984 | Aoki et al. | 123/674 |
| 4,498,445 | 2/1985 | Hasegawa et al. | 123/674 |
| 4,546,747 | 10/1985 | Kobayashi et al. | 123/674 |
| 4,570,599 | 2/1986 | Hasegawa et al. | 123/674 |
| 4,913,122 | 4/1990 | Uchida et al. | 123/674 |
| 5,029,569 | 7/1991 | Cullen et al. | 123/494 |
| 5,320,080 | 6/1994 | Kadowaki | 123/674 |
| 5,414,994 | 5/1995 | Cullen et al. | 60/274 |

*Primary Examiner*—Andrew M. Dolinar
*Attorney, Agent, or Firm*—Allan J. Lippa; Roger L. May

[57] ABSTRACT

A managed fuel air control system is provided that transitions between a closed loop stoichiometric A/F mode and an open loop lean A/F mode of operation. When conditions permit open loop lean operation, the engine A/F is ramped from stoichiometric to the desired lean A/F. Periodically, while operating in the open loop lean mode, the system returns to the closed loop stoichiometric mode to update an open loop correction factor used during the open loop lean mode. The time at stoichiometric is usually limited to the time it takes to correct errors in calibration data that have occurred during open loop operation. During lean operation, the adaptive corrections learned at stoichiometric A/F are applied.

23 Claims, 6 Drawing Sheets

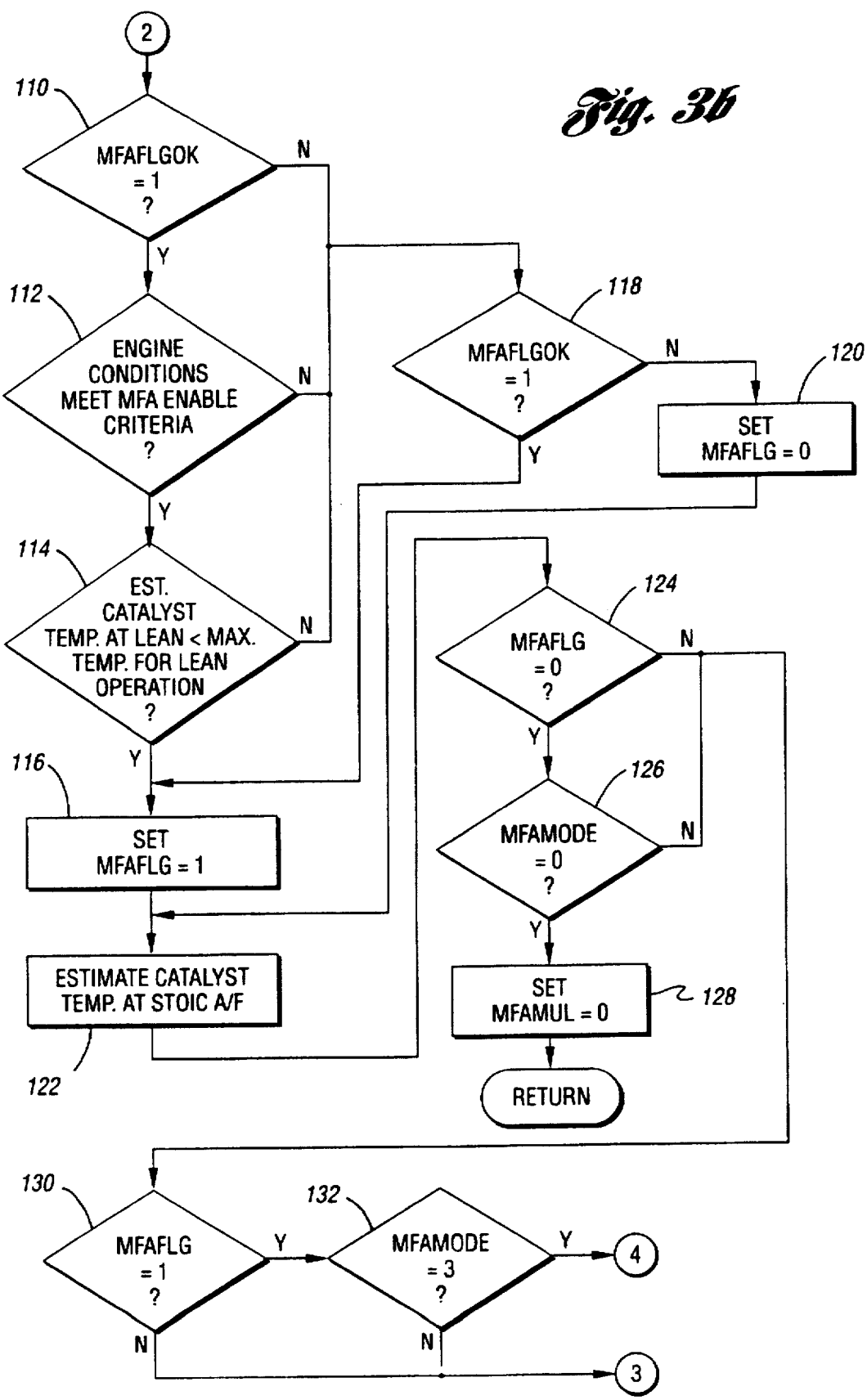

METHOD AND APPARATUS FOR IMPROVING VEHICLE FUEL ECONOMY

TECHNICAL FIELD

This invention relates to vehicle fuel control systems and, more particularly, to a method of improving fuel economy by employing a managed fuel air (MFA) mode of operating the engine that includes an open loop lean mode of engine operation interrupted periodically by a closed loop stoichiometric mode of engine operation during which a lean mode correction factor is updated.

BACKGROUND ART

It is well known in the art that higher fuel efficiency can be obtained by controlling the air/fuel ratio (A/F) on the lean side of stoichiometric. However, the traditional exhaust gas oxygen sensor (EGO) does not provide continuous information during lean A/F operation. Instead the EGO sensor is essentially a switch with a transition at stoichiometric A/F. Thus, when operating lean, the engine is not robust with respect to noise factors such as age related deterioration of components, manufacturing variability of components, and environmental factors. As a result, engine fuel economy and driveability may deteriorate.

Efforts to improve open loop lean operation, such as, for example, Aoki et al U.S. Pat. No. 4,445,481, utilize an open loop lean correction factor learned while operating at closed loop stoichiometric. However, such learning does not take place under conditions that exist during lean cruise operation but rather under other conditions such as immediately after engine warmup. Other proposals, such as disclosed in Uchida et al U.S. Pat. No. 4,913,122 and Hasegawa U.S. Pat. No. 4,498,445, learn and store a plurality of correction factors under various closed loop engine conditions to be used when similar engine conditions occur while operating open loop. None of these prior art systems proposes periodically interrupting open loop lean operations and returning to closed loop stoichiometric operation to update the open loop correction factor under existing under-hood temperature conditions and engine operating conditions.

SUMMARY OF THE INVENTION

The present invention overcomes the aforementioned problem by using the traditional EGO sensor in a quasi-closed loop manner. A managed fuel air mode is provided which transitions from a closed loop stoichiometric A/F mode to an open loop lean mode of operation whenever an open loop enable criteria is met. When the lean mode is enabled, the engine A/F is ramped to a desired lean A/F and periodically, while in the lean mode, the A/F is ramped back to the closed loop stoichiometric A/F mode. The ramping from stoichiometric to lean and from lean to stoichiometric usually occurs at a slow rate to avoid any abrupt change in torque. At closed loop stoichiometric operations, an adaptive control algorithm learns or updates a long term correction factor that is used during the open loop lean A/F mode of operation. The time at closed loop stoichiometric is usually limited to the time it takes for the adaptive strategy to be completed. When learning is complete the A/F ratio is slowly ramped back to the desired lean A/F ratio. During lean operation, the adaptive corrections learned at stoichiometric are applied.

Under certain circumstances, an immediate return to stoichiometric may be warranted. For example, if an EGO switch occurs prior to reaching stoichiometric, that is, during the slow rate ramp, then the open loop correction factor is in error and a jump to closed loop stoichiometric is warranted. Under other circumstances, a return to stoichiometric from lean is prevented. For example, if while running lean, an estimate of the anticipated temperature of the catalytic converter during stoichiometric operation is found to be above a calibratable maximum temperature, then the ramp from lean to stoichiometric is disabled until such time as the temperature drops below the set maximum temperature. Also, whether a ramp from stoichiometric to lean will be permitted is dependent on the estimated catalytic converter temperature that would result from operating at lean A/F under existing speed and load conditions.

BRIEF DESCRIPTION OF THE DRAWINGS

A more complete understanding of the present invention may be had from the following detailed description which should be read in conjunction with the drawings in which:

FIGS. 3a–3e are flowcharts showing the operation of a preferred embodiment of the invention.

DETAILED DESCRIPTION OF PREFERRED EMBODIMENT

Figure 1:
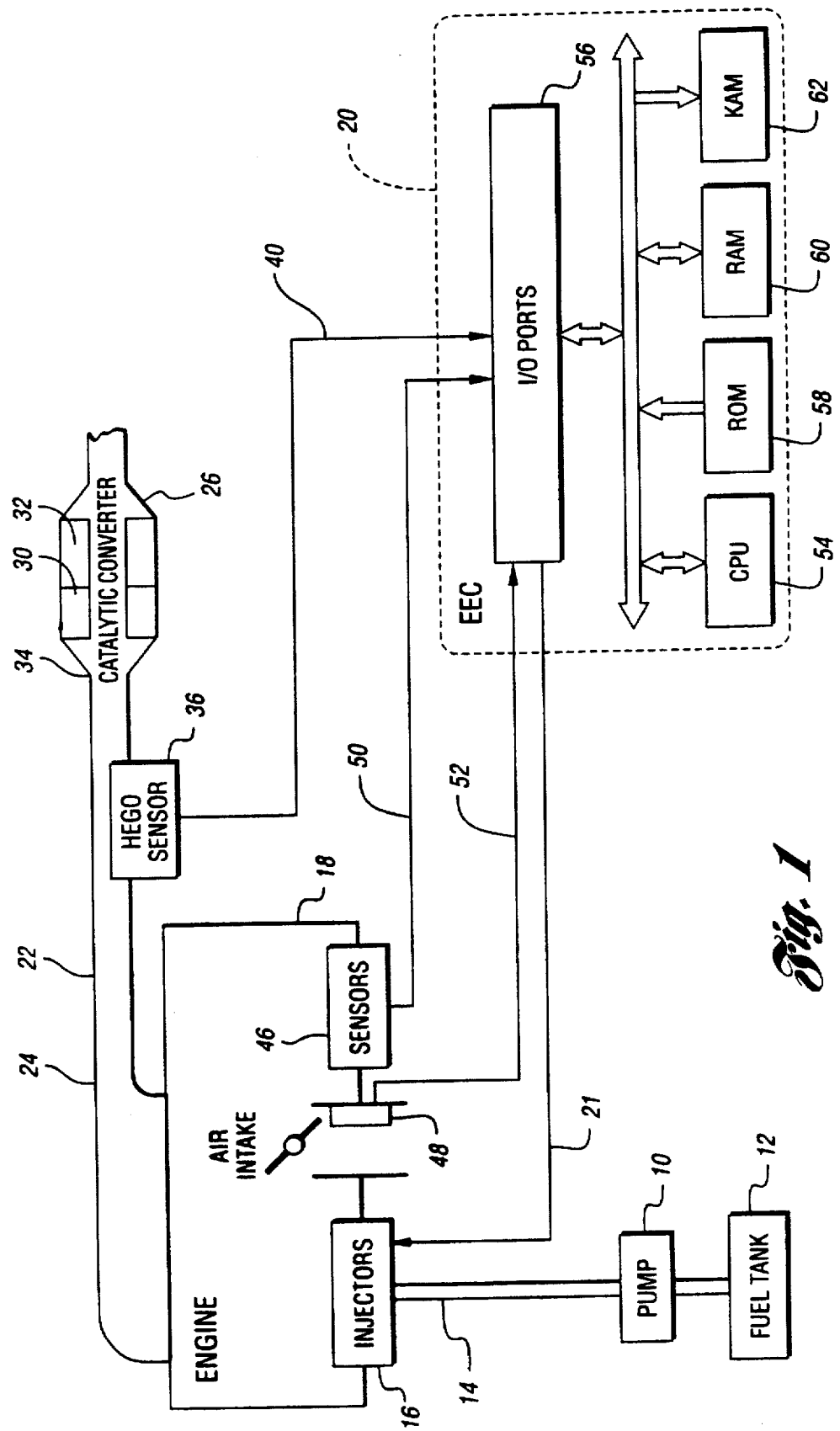
FIG. 1 is an overall block diagram of the control system of the invention.

Referring now to the drawings, and initially to FIG. 1, a fuel pump 10 pumps fuel from a tank 12 through a fuel line 14 to a set of injectors 16 which inject fuel into an internal combustion engine 18. The fuel injectors 16 are of conventional design and are positioned to inject fuel into their associated cylinder in precise quantities as determined by an electronic engine controller (EEC) 20, transmitting a fuel injector signal to the injectors 16 via signal line 21. The fuel injector signal is varied over time by EEC 20 to maintain an air/fuel ratio determined by the EEC 20. The fuel tank 12 contains liquid fuels, such as gasoline, methanol or a combination of fuel types. An exhaust system 22, comprising one or more exhaust pipes and an exhaust flange seen at 24, transports exhaust gas produced from combustion of an air/fuel mixture in the engine to a catalytic converter 26. The converter 26 is shown in FIG. 1 in a cross-sectional view and contains a catalyst material 30 and 32. The converter 26 chemically alters exhaust gas that is produced by the engine and enters the converter through exhaust gas inlet 34 to generate a catalyzed exhaust gas.

A heated exhaust gas oxygen (HEGO) sensor 36 detects the oxygen content of the exhaust gas generated by the engine 18 and transmits a representative signal over conductor 40 to the EEC 20. Though not shown, a second HEGO sensor is preferably used when the vehicle has a V-8 engine. Still other sensors, indicated generally at 46, provide additional information about engine performance to the EEC 20, such as crankshaft position, angular velocity, throttle position, air temperature, etc., over conductor 50. The information from these sensors is used by the EEC 20 to control engine operation.

A mass air flow sensor 48 positioned at the air intake of engine 18 detects the amount of air inducted into an induction system of the engine and supplies an air flow signal over conductor 52 to the EEC 20. The air flow signal is utilized by EEC 20 to calculate a value termed air mass (AM) which is indicative of a mass of air flowing into the induction system in lbs./min.

The EEC 20 comprises a microcomputer including a central processor unit (CPU) 54, input and output (I/O) ports 56, read only memory (ROM) 58 for storing control programs, random access memory (RAM) 60, for temporary data storage which may also be used for counters or timers, and keep-alive memory (KAM) 62 for storing learned values. Data is communicated over a conventional data bus as shown.

Figure 2:
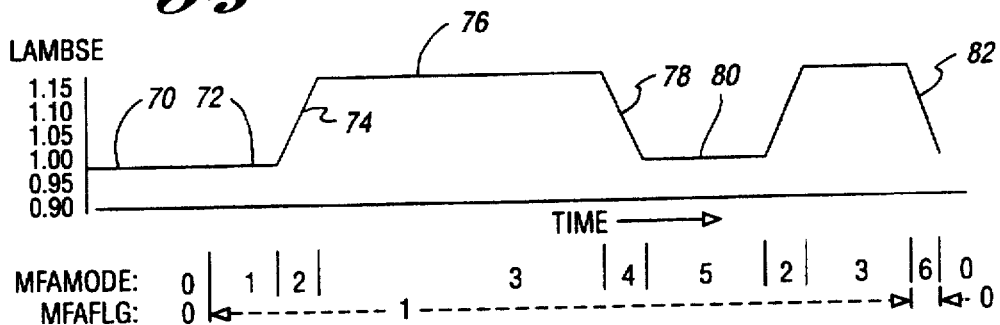
FIG. 2 is a graph illustrating the various modes of the managed fuel air mode of engine operation implemented in accordance with the invention.

The program stored in ROM 58 implements an air/fuel strategy that is depicted in the graph of FIG. 2. Several speed/load type conditions exist for entry into the managed fuel air (MFA) mode. Most of these have a hysteresis term to prevent hunting. The hysteresis terms makes it harder to enter the MFA mode than to exit the mode. Thus more stringent conditions apply to entry than exit.

While an entry flag (MFAFLG) is set to 1, MFA mode may assume one of several states from MFAMODE=1 to MFAMODE=5. During lean A/F operation (MFAMODE=3) the system periodically ramps back to stoichiometric A/F (MFAMODE=5) and operates in a closed loop so that an adaptive learning process can take place. Care is taken to ramp from stoichiometric to lean and from lean to stoichiometric over long periods of time so that the driver does not notice a reduction in engine torque. The A/F changes are ramped in via a multiplier MFAMUL which equals 0 when at stoichiometric closed-loop and equals 1 when the lean A/F is fully ramped in.

There are three ways to transition from lean to stoichiometric. When the strategy calls for a stoichiometric adaptive update, MFAMODE=4 is used to achieve a very slow ramp on the order of twenty seconds. If while operating at MFAMODE=3 an exit criteria is met, then MFA mode is exited using MFAMODE=6. The MFAMODE=6 procedure is the same as MFAMODE=4 except a quicker ramp, on the order of a few seconds, is provided. If the driver demands rich open loop power then a jump to MFAMODE=0 rather than a ramp is used to exit MFA mode.

MFAFLG equals 0 until MFA mode entry conditions are met at which time MFAFLG is set to 1 and the MFA mode can change from MFAMODE=0, indicated at 70, to MFAMODE=1 indicated at 72. During MFAMODE=1, minimum learning at stoichiometric takes place before going lean. Exit from MFAMODE=1 to MFAMODE=2 is dependent on the occurrence of a minimum number of EGO switches within a predetermined time interval. If the time expires before the minimum number of EGO switches occurs then the MFA mode is reset to MFAMODE=0. If the MFA mode entry criteria is still met, the MFA mode will again be set to MFAMODE=1 on the next program background loop and the system will again check for the required number of switches in the maximum allowable time.

During MFAMODE=2, indicated at 74, the A/F is ramped from stoichiometric to lean by incrementing the multiplier factor by a fixed amount each background loop. This ramping occurs at a slow rate so the driver does not feel the loss in torque at a given throttle position during the ramp to lean.

During MFAMODE=3, indicated at 76, the strategy runs a steady lean A/F until either MFAFLG is set to zero as a result of meeting the MFA mode exit criteria or until a calibratable time interval passes. After the time interval expires, MFA mode assumes MFAMODE=4, indicated at 78, where a slow ramp back to stoichiometric occurs, for a closed loop update of the fuel correction factor used during the next lean operation. While in MFAMODE=3, a catalyst mid-bed temperature is calculated in order to estimate the effect of the next transition from lean to stoichiometric A/F.

If this projected temperature exceeds a calibratable limit, then entry to MFAMODE=4 ramp is prevented by resetting a timer used to determine whether the normal MFAMODE=3 time interval has expired.

During MFAMODE=4, the A/F is incrementally reduced from lean to stoichiometric by decrementing the aforementioned multiplier factor by a fixed amount each background loop. If an EGO switch is encountered before completion of the MFAMODE=4 ramp, then MFAMODE=5 (closed loop stoichiometric) is selected.

During MFAMODE=5, indicated at 80, the open loop correction factor used during lean operation is updated through a closed loop adapted learning process. The learning process continues until a stoichiometric A/F is achieved, within a set tolerance, or until a calibratable number of EGO switches are detected.

During MFAMODE=6, indicated at 82, the strategy ramps from lean to stoichiometric by decrementing the multiplier function by a fixed amount each background loop. This mode differs from MFAMODE=4 in that the MFAFLG has been set to 0 and the MFA mode is being exited instead of the very slow ramp rates used for MFAMODE=4, a faster ramp rate is used. If an EGO switch is encountered before the multiplier is decremented to zero, closed loop stoichiometric (MFAMODE=0) is immediately entered.

Referring now to FIGS. 3a–3f, a flowchart of software implementing the strategy depicted in FIG. 2 is shown. The program is entered at 90, and at block 92 a decision is made as to whether the MFA mode may be entered based on various sensor checks. If a failure of the EGO or ECT sensor is detected or KAM is corrupted, then flag MFAFLGOK is set to 0 at block 94. Otherwise the flag is set to 1 at block 96. In either event, at block 98 a calculation is made of what the lean A/F would be if MFAMODE=3 is entered at the present engine speed and load. The formula used in this calculation is:

LAMBSE_TRY=1+MFALAMADD where;

MFALAMADD=FN1328A(N, PERLOAD)=a calibrated amount stored in a look-up table which is to be added to 1 to achieve a desired equivalence ratio (A/F over Stoichiometric A/F) at the existing speed and load and; PERLOAD=current air flow divided by peak air flow at wide open throttle.

Further details may be obtained from U.S. Pat. Nos. 5,029,569 and 5,414,994, assigned to the assignee of the present invention. Utilizing this calculated A/F, the catalyst temperature that would result if MFAMODE=3 was entered, is estimated at block 100 using the formula:

CATMID_LEAN=(EXT_SS_FLS*FN441A (LAMBSE_TRY))+FN448(AM)*FN448A (LAMBSE_TRY)–EXT_LS_CIN where;

CATMID_LEAN is the estimated catalyst temperature (Degrees Fahrenheit);

EXT_SS_FLS=estimate of catmid temperature (Degrees Fahrenheit) at stoichiometric A/F;

FN441A=calibratable effect of A/F on exhaust flange temperature (unitless);

FN448A=calibratable effect of A/F on catalyst exotherm (Degrees Fahrenheit);

FN448=calibratable effect of air mass on catalyst exotherm (unitless);

EXT_LS_CIN is the temperature drop from the exhaust flange to the catalyst inlet (Degrees Fahrenheit).

Further details may be obtained from the aforementioned U.S. Pat. No. 5,414,994.

The logic at blocks 102–108 establish the criteria for exiting the MFA mode, while the logic at blocks 110–120 establish the criteria for entering the MFA mode. As indicated previously, the strategy sets the entry and exit conditions so as to make it more difficult to enter than to exit the MFA mode of operation. At block 102, flag MFAFLG is set to 0 if flag MFAFLGOK is zero as determined by decision block 104, or if any one of several engine conditions meet a disable criteria as determined by decision block 106, or if the catalyst temperature estimated at block 100 exceed a predetermined maximum temperature as determined by decision block 108. Engine conditions that are monitored for threshold violations may be coolant temperature, throttle position, engine speed, load, barometric pressure, vehicle speed, and transmission gear. At block 116, MFAFLG is set to 1 if MFAFLGOK=1, the enable criteria is met, and estimated catalyst temperature at lean is less than a predetermined maximum, as determined by decision blocks 110, 112, and 114 respectively. Otherwise, MFAFLG is maintained at MFAFLG=0 by decision block 118 and block 120.

At block 122 an estimate of catalyst temperature at stoichiometric is calculated using the formula described in connection with block 100, where LAMBSE_TRY=1. If MFAFLG=0 and MFAMODE=0, the logic at 124-128 sets the aforementioned multiplying factor, designated MFA-MUL to 0 and the program returns to other EEC background calculations.

Figure 3A:
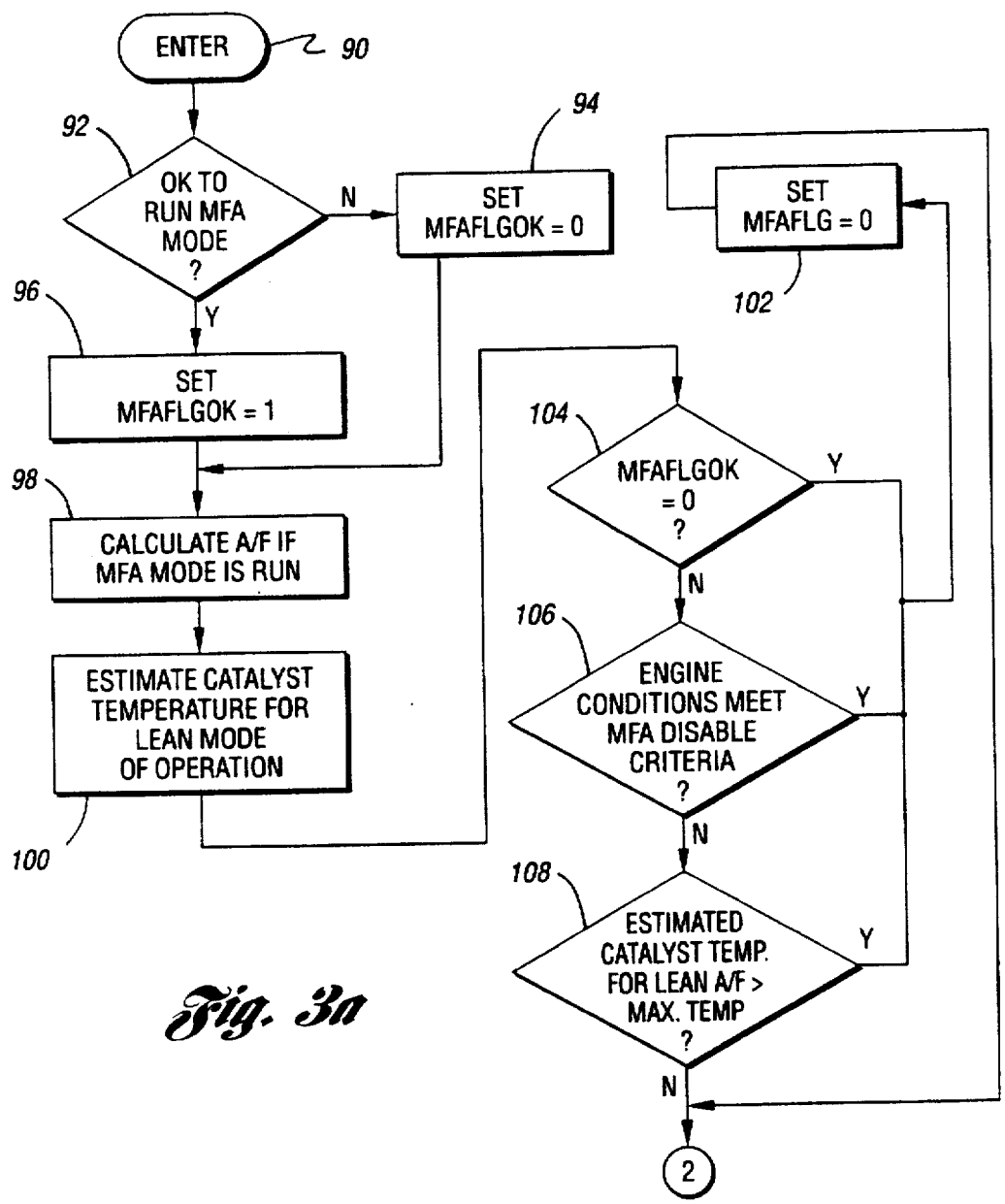
Figure 3C:
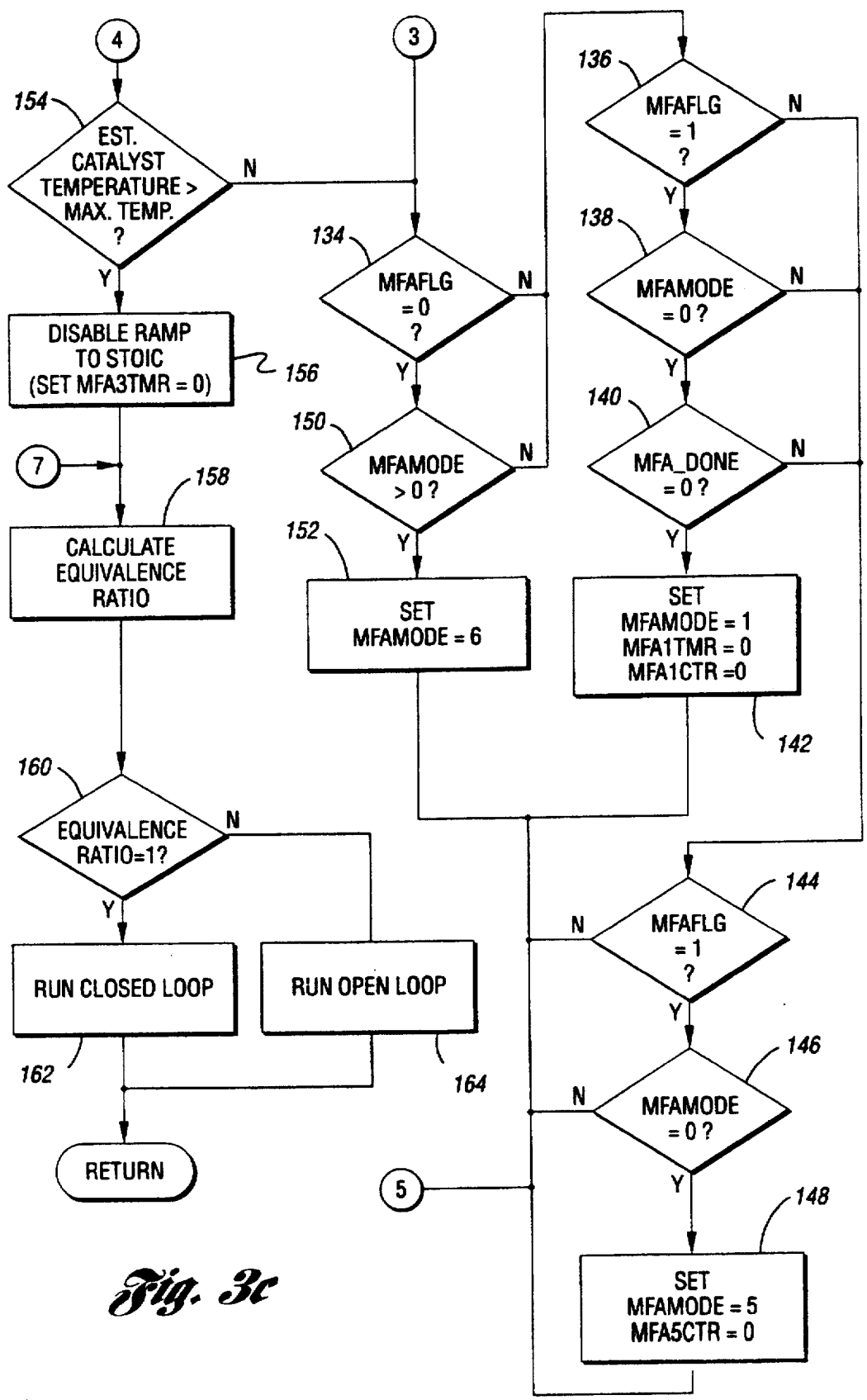
Figure 3B:
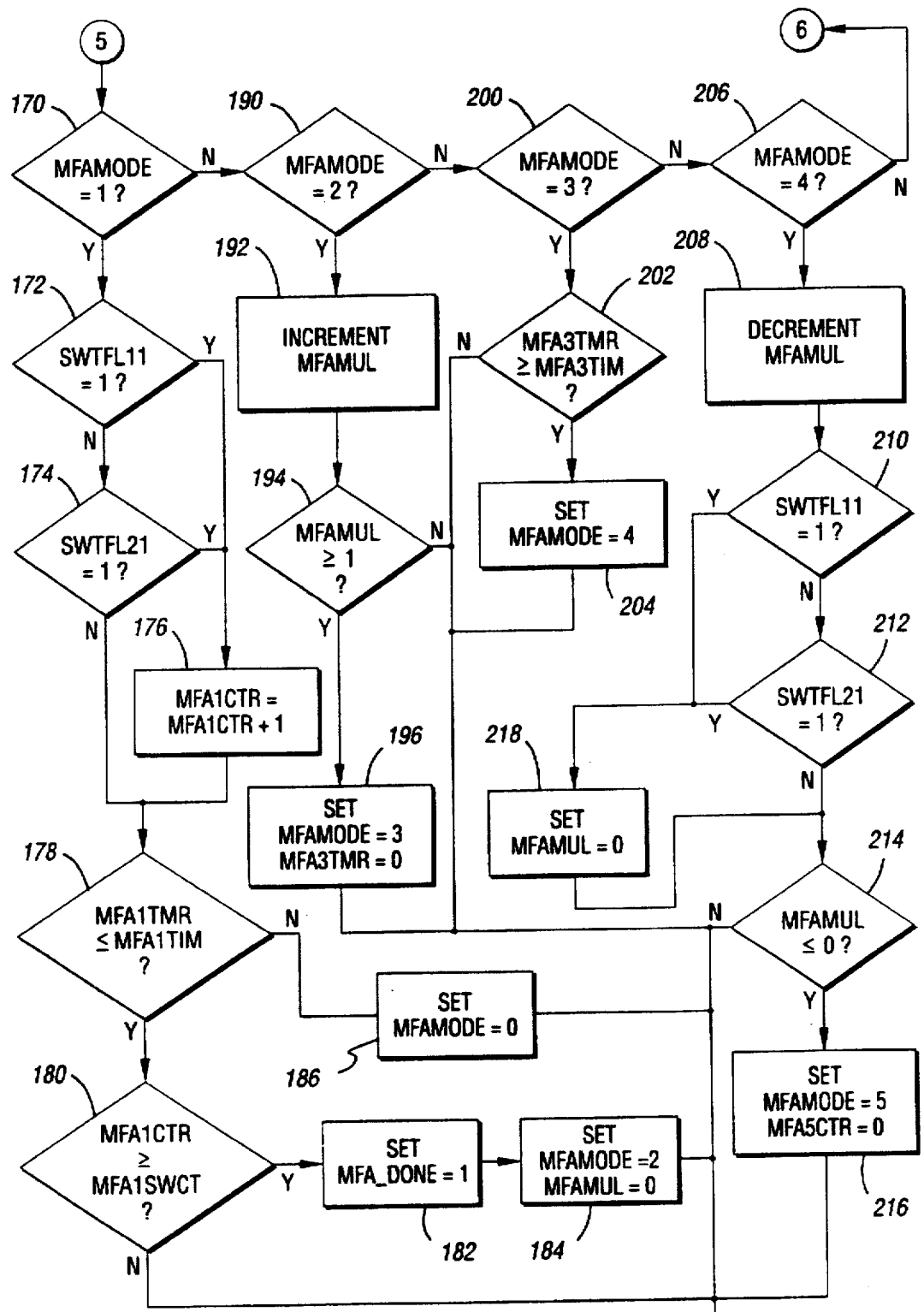
Figure 3E:
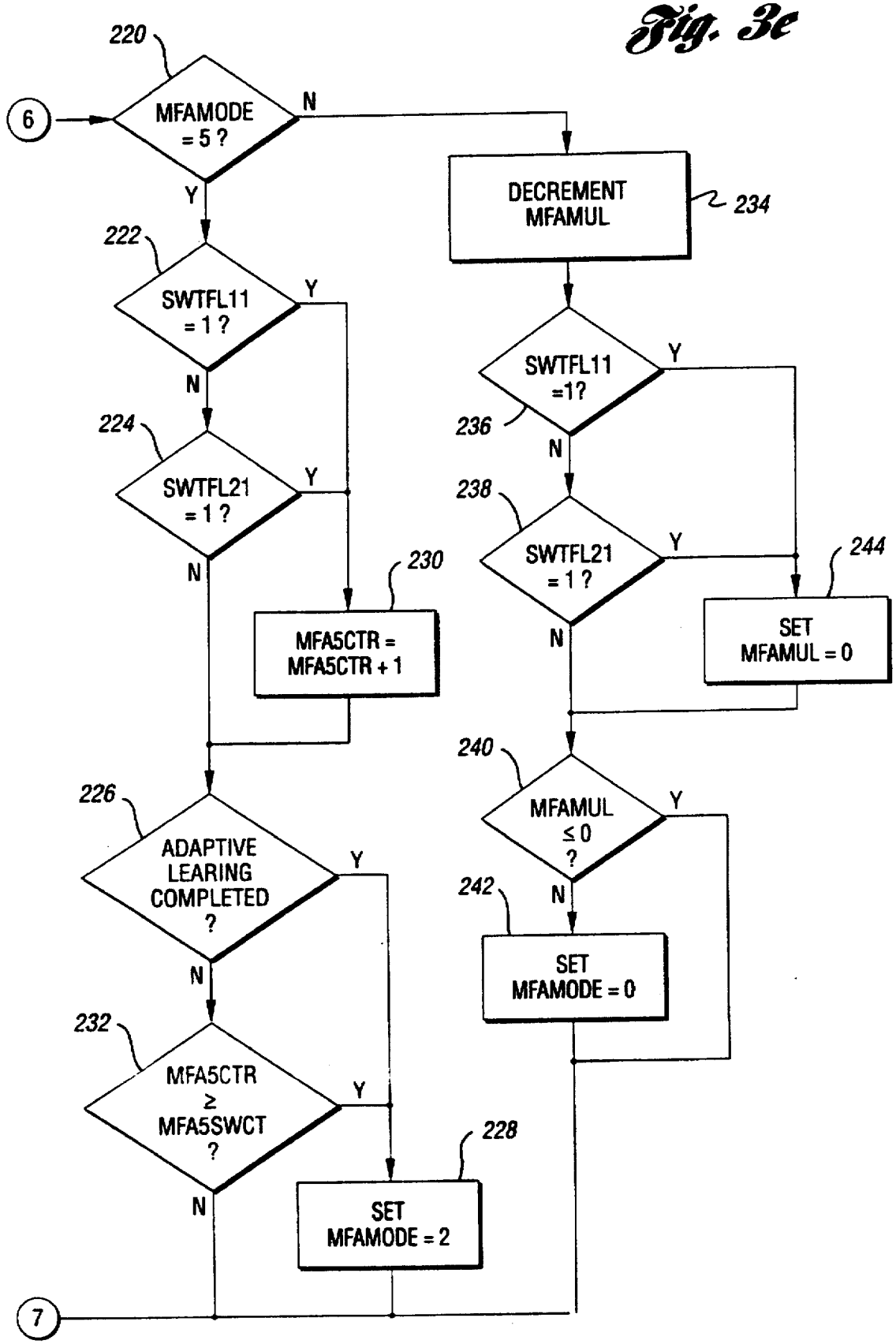

If MFAFLG is set to 1, as determined by block 130, while MFAMODE=0, as determined by blocks 132-138 then a flag MFA_DONE is checked at 140. Flag MFA_DONE will be further discussed hereinafter and serves to control whether the state machine should go to MFAMODE=1 or MFAMODE=5 following MFAMODE=0. MFA_DONE is reset to 0 at initialization, and the first time MFA_DONE is checked, the state machine transitions at block 142 from MFAMODE=0 to MFAMODE=1. Thereafter, while MFA DONE=1, if MFAFLG is set to 1 while MFAMODE=0 as determined by blocks 144-146, the state machine transitions at block 148 from MFAMODE=0 to MFAMODE=5 and a counter MFA5CTR is reset to 0. If MFAFLG is set to 0 while MFAMODE is greater than 0, as determined by blocks 134 and 150, then block 152 sets MFAMODE=6. If mode setting occurs from block 142, 148 or 152, selection logic in FIGS. 3d and 3e is entered. If MFAMODE=3 as determined in block 132, then at block 154 the estimated catalyst at stoichiometric is checked to see if MFAMODE=4 is permitted. If less that the maximum catalyst temperature, then the selection logic in FIGS. 3d and 3e is entered. If the maximum temperature is exceeded, then at block 156 the MFAMODE=3 timer is reset to 0 thereby extending the time in MFAMODE=3 beyond the normal time.

Referring now to FIGS. 3d and 3e, the actions to be taken in the various modes is depicted. If the machine is in MFAMODE=1 as determined by block 170, then a minimum learning at stoichiometric takes place before going lean as determined by the blocks 172-184. Minimum learning requires operation at stoichiometric for a minimum number of EGO switches between lean and rich within a predetermined maximum time interval. Otherwise the transition to lean is temporarily abandoned. If either of the two EGO switches detects a switch between rich and lean A/F ratios since the previous loop, then one of the blocks 172 or 174 will be true and a counter MFA1CTR is incremented as indicated in block 176. A timer MFA1TMR is set to 0 upon entry to MFAMODE=1 at block 142. If timer MFA1TMR is less than or equal to a predetermined time interval MFA1TIM, as determined by block 178 then the counter MFA1CTR is checked, at block 180, to see if the minimum number of switches has occurred. If so, then flag MFA_DONE is set to 1 at block 182, and block 184 sets MFAMODE=2 and MFAMUL=0 and the program goes to block 158 (FIG. 3c) to calculate the equivalence ratio as follows:

equivalence_ratio=1+((FN1328A(N,PERLOAD)* MFAMUL))

The equivalence ratio is used in calculating the desired fuel flow as described below. If MFA1TIM is reached before the minimum number of EGO switches occur, then block 186 sets MFAMODE=0 and the program returns to other EEC background calculations.

If the state machine is set to MFAMODE=2, then the next time through the loop, this state is detected at block 190. MFAMUL is incremented at block 192 each pass through this loop. MFAMUL is checked at block 194, and if less than 1, the desired equivalence ratio is calculated at block 158 to blend from stoichiometric to lean during MFAMODE=2. When MFAMUL is equal to or greater than 1, i.e., the transition to lean has been completed, as determined by block 194, then block 196 sets MFAMODE=3 and resets the timer MFA3TMR to 0 and the program continues at block 158 to calculate the desire equivalence ratio.

While the state machine is in MFAMODE=3 as determined by block 200, a timer MFA3TMR is checked at block 202 and when a predetermined time interval MFA3TIM has expired, block 204 sets MFAMODE=4 and the program continues at block 158. As long as the time interval has not expired, the state machine remains in MFAMODE=3 and the program continues at block 158 to calculate the desired equivalence ratio.

While the state machine is in MFAMODE=4 as determined by block 206, MFAMUL is decremented at block 208, each pass through this loop. If no EGO switch has occurred since the last loop and MFAMUL is greater than 0, as determine by blocks 210-214, the desired equivalence ratio is calculated at 158 in order to blend from lean to stoichiometric. When MFAMLrL is equal to or less than 0, i.e., the transition to stoichiometric has been completed, as determined by block 214 then block 216 sets MFAMODE=5 and resets counter MFA5CTR to 0. If during the ramp to stoichiometric an EGO switch occurs as detected at blocks 210 or 212, then MFAMUL is set to 0 at block 218 which causes the ramp to be abandoned and an immediate transition to MFAMODE=5 occurs.

If the state machine is in MFAMODE=5 as determined by block 220, and no EGO switch has occurred since the last loop, as determined by blocks 222 and 224, then adaptive learning at stoichiometric takes place until an open loop correction factor KAMREF has adjusted sufficiently to compensate for any measurement errors that have developed since the last closed loop operation so that these errors do not affect open loop lean calculation. This is determined at block 226 which tests the result of the following equation; ABS (1-LAMAVE)<=MFA5LAMTOL where LAMAVE is the average of the two most recent minimum and two most recent maximum short term closed loop A/F correction terms over one rich to lean cycle;

MFA5LAMTOL is a calibrated tolerance number establishing how close to stoichiometric the system must be driven before going lean again.

If the absolute value of 1 minus the average of the two most recent short term open loop A/F correction factors is less than or equal to the calibrated tolerance, then block 228 sets MFAMODE=2. After setting MFAMODE=2, the program continues to block 158.

Each time an EGO switch occurs, the counter MFA5CTR is incremented at block 230 and compared with a calibratable number of switch occurrences MFA5SWCT at block 232. If learning is not complete as determined by block 226 and the maximum number of switches has not occurred, then the program continues at block 158. However, if the maximum number of EGO switches occur during the learning process, block 228 will set MFAMODE=2 and proceed to block 158.

If MFAMODE=6 as detected by the NO branch at block 220, then MFAMUL is decremented each loop at block 234. If no EGO switches have occurred, as determined by blocks 236 and 238, and MFAMUL is not less than or equal to 0 as determined by block 240, then block 242 sets MFAMODE =0 and the program continues to block 158 to calculate the equivalence ratio. On the other hand, if during MFAMODE= 6, an EGO switch occurs as detected by blocks 236 or 238, block 244 sets MFAMUL=0, and the program continues to block 158 via the YES branch of block 240.

Returning to FIG. 3c, at block 158 the equivalence ratio is calculated. The equivalence ratio is the number looked up in table FN1328A multiplied by MFAMUL and added to 1. The ratio is checked at block 160, and the fuel mass required for closed loop stoichiometric operation is calculated at block 162 if the ratio is equal to 1. Otherwise the fuel mass required for open loop lean operation is calculated at 164 and the program returns to other EEC background calculations.

The closed loop fuel mass calculation is used for learning during MFAMODE=5 or MFAMODE=1, or whenever MFA disable conditions exist, but also may be used when MFAMODE=3 at relatively high percentage load conditions where lean air/fuel would not deliver the required power. This can be accomplish by entering 0 in the table FN1328A at these speed and load conditions.

The required closed loop fuel flow may be expressed as:

$$fuel\_mass = (air\_mass * KAMREF)/(equivalence\_ratio * LAMAVE)$$

From this fuel mass calculation a fuel pulse width can be determined based on the fuel injector characteristic function. An example of the updating of KAMREF is to assume that there is a −10% error in the air mass measurement and that KAMREF is initially set to 1 and MFA5LAMTOL equals 0.02. In feedback control, the short term correction factor LAMAVE term will be driven to 0.9 to achieve stoichiometric A/F. This will happen very quickly because the feedback system is designed to ramp fuel pulse-width as much as is required to achieve EGO switches. The long term trim, KAMREF, will respond to the fact that LAMAVE is consistently equal to about 0.9. It is intentionally learned at a slow rate so it can differentiate true error from noise such as that which occurs on transients. In this case, KAMREF will eventually equal about 1.11(1/0.9). When this occurs, LAMAVE will equal about 1.0 and the expression evaluated at block 226 will be true and the ramp to lean (MFAMODE= 2) should begin.

The required open loop fuel flow may be expressed as:

$$fuel\_mass = (air\_mass * KAMREF)/equivalence\_ratio$$

Note that in the open loop calculation the short term correction factor LAMAVE is not used. However, the long term correction factor KAMREF is used to accurately achieve the desired lean A/F.

While the best mode for carrying out the present invention has been described in detail, those familiar with the art to which this invention relates will recognize various alternative designs and embodiments for practicing the invention as defined by the following claims.

What is claimed is:

1. A method of controlling the air/fuel ratio of an internal combustion engine comprising a sequence of the following steps:

detecting, while in a closed loop fuel control mode, whether the air/fuel ratio of the engine is rich or lean with respect to a stoichiometric ratio and modifying a short term fuel correction factor as necessary to achieve said stoichiometric ratio, updating a long term fuel correction factor, based on changes in said short term correction factor while at said stoichiometric ratio, switching to an open loop fuel control mode when predetermined open loop entry conditions are met and increasing the air/fuel ratio from said stoichiometric ratio to a predetermined lean ratio using said long term correction factor, periodically switching from said open loop fuel control mode to said closed loop fuel control mode to update said long term correction factor by operating said engine in said closed loop mode until said stoichiometric ratio is achieved within a predetermined tolerance or until a predetermined number of switches between said rich and said lean ratios are detected and after said update returning to said open loop fuel mode, whereby said long term correction factor used during the open loop fuel control mode is periodically updated under existing engine operating conditions.

2. The method defined in claim 1 further comprising the steps of incrementally modifying the ratio during a transition between said lean and said stoichiometric ratios to avoid rapid changes in engine torque.

3. The method defined in claim 2 comprising the further steps of estimating a closed loop catalyst temperature while in said open loop mode and inhibiting a transition to said closed loop mode if the estimated catalyst temperature exceeds a predetermined closed loop maximum catalyst temperature.

4. The method defined in claim 3 comprising the further steps of estimating an open loop catalyst temperature while in said closed loop mode and inhibiting a transition to said open loop mode if the estimated catalyst temperature exceeds a predetermined open loop maximum catalyst temperature.

5. The method defined in claim 4 comprising the step of immediately switching to said closed loop mode if during an open loop transition to said stoichiometric ratio, a rich air/fuel ratio is detected.

6. The method defined in claim 5 comprising the step of initiating the first transition from said stoichiometric ratio to said lean ratio after a predetermined number of switches between said rich ratio and said lean ratio following detection of said entry conditions.

7. A system for controlling engine air/fuel ratio including at least one exhaust gas oxygen (EGO) sensor and a finite state machine;

said machine assuming a STATE 0 in which the engine is operated at stoichiometric A/F in response to computer initialization and engine warmup;

said machine responsive to predetermined entry conditions to transition from said STATE 0 to a STATE 1 upon the first occurrence of said entry conditions;

said machine transitioning from said STATE 1 to a STATE 2 in response to a first predetermined number of EGO switches within a predetermined time interval and otherwise returning to STATE 0;

said machine increasing said engine A/F toward a lean A/F at a first predetermined rate in an open loop control scheme, while in said STATE 2 and transitioning to a STATE 3 upon reaching a predetermined lean A/F;

said machine maintaining said STATE 3 for a predetermined time interval and thereafter transitioning to a STATE 4 where said engine A/F is reduced toward stoichiometric at said first predetermined rate;

said machine transitioning to a STATE 5 upon said engine A/F reaching stoichiometric;

said machine while in said STATE 1 or said STATE 5 calculating fuel flow based on calibration data modified by a short term feedback correction factor, and updating an open loop correction factor based on the long term variations of said short term correction factor;

said machine transitioning from said STATE 5 to said STATE 2 upon the first to occur of completion of said updating or upon detection of a second predetermined number of EGO switches.

8. The system of claim 7 wherein said machine is responsive to predetermined exit conditions to transition from said STATE 3 to a STATE 6 where said engine A/F is reduced toward stoichiometric at a second predetermined rate exceeding said first predetermined rate.

9. The system of claim 8 wherein said machine immediately switches to a closed loop stoichiometric A/F upon detection of EGO switch during said STATE 6.

10. A method of controlling the air/fuel ratio of an internal combustion engine comprising a sequence of the following steps:

controlling the flow of fuel to the engine during a closed loop fuel control mode to achieve a stoichiometric A/F ratio while updating an open loop fuel correction factor, transitioning to an open loop fuel control mode when predetermined open loop entry conditions are met and increasing the air/fuel ratio from said stoichiometric ratio to a predetermined lean ratio using said open loop correction factor, periodically switching from said open loop fuel control mode to said closed loop fuel control mode to update said long term correction factor by operating said engine in said closed loop mode until an A/F is achieved within a predetermined tolerance of said stoichiometric ratio or until a predetermined number of switches between a rich A/F and a lean A/F are detected and after said update returning to said open loop fuel mode, whereby said long term correction factor used during the open loop fuel control mode is periodically updated under existing engine operating conditions.

11. A system for controlling the air/fuel ratio of an internal combustion engine comprising;

at least one engine exhaust sensor for detecting whether the engine A/F is rich or lean of a stoichiometric A/F ratio, a computer for controlling the flow of fuel to said engine during a closed loop fuel control mode to achieve said stoichiometric A/F ratio while updating an open loop fuel correction factor, said computer transitioning to an open loop fuel control mode upon completion of said updating and increasing the A/F from said stoichiometric A/F ratio to a predetermined lean ratio using said open loop correction factor, said computer being programmed to exit said open loop fuel control mode and return to said closed loop mode of engine A/F control to update said long term correction factor by operating said engine in said closed loop mode until an A/F is achieved within a predetermined tolerance of said stoichiometric ratio or until a predetermined number of switches between a rich A/F and a lean A/F are detected by said EGO sensor and after said update to return to said open loop fuel mode, whereby said long term correction factor used during the open loop fuel control mode is updated under existing engine operating conditions.

12. A method of controlling the air/fuel ratio of an internal combustion engine comprising a sequence of the following steps:

determining an open loop fuel correction factor while operating the engine in a closed loop fuel control mode, transitioning to an open loop fuel control mode wherein the fuel calculation includes said open loop correction factor, transitioning from said open loop fuel control mode to said closed loop fuel control mode to modify the value of said open loop correction factor to reflect changes in operating conditions since the previous closed loop operation and prior to terminating engine operation returning to said open loop fuel control mode and using the modified correction factor in the open loop fuel calculation.

13. The method defined in claim 12 wherein the flow of fuel to the engine during said closed loop fuel control mode is controlled to achieve a stoichiometric A/F ratio and the flow of fuel to the engine during said open loop fuel control mode is controlled to achieve an A/F that is lean of said stoichiometric A/F ratio.

14. The method defined in claim 13 wherein operation of said engine in said closed loop control mode is terminated and return to said open loop fuel control mode is initiated as soon as a predetermined condition of closed loop operation is met.

15. The method defined in claim 14 wherein said predetermined condition of closed loop operation is that said stoichiometric ratio is achieved within a predetermined tolerance.

16. The method defined in claim 14 wherein said predetermined condition of closed loop operation is that a predetermined number of switches between a rich A/F and a lean A/F are detected prior to achieving an A/F within a predetermined tolerance of said stoichiometric ratio.

17. The method defined in claim 14 further comprising the step of operating said engine in said closed loop mode after engine warmup and switching to said open loop mode upon the detection of predetermined entry conditions.

18. The method defined in claim 17 comprising the step of initiating the first transition from said stoichiometric A/F to said lean ratio after a predetermined number of switches between a rich A/F and a lean A/F following detection of said entry conditions.

19. The method defined in claim 14 further comprising the steps of incrementally modifying the A/F during a transition between a lean A/F and said stoichiometric A/F to avoid rapid changes in engine torque.

20. The method defined in claim 19 comprising the further steps of estimating a closed loop catalyst temperature while in said open loop mode and inhibiting a transition to said closed loop mode if the estimated catalyst temperature exceeds a predetermined closed loop maximum catalyst temperature.

21. The method defined in claim 20 comprising the step of immediately switching to said closed loop mode if during an open loop transition to said stoichiometric A/F, a rich A/F is detected.

22. The method defined in claim 21 wherein said predetermined condition of closed loop operation is that said stoichiometric ratio is achieved within a predetermined tolerance.

23. The method defined in claim 21 wherein said predetermined condition of closed loop operation is that a predetermined number of switches between a rich A/F and a lean A/F are detected prior to achieving an A/F within a predetermined tolerance of said stoichiometric ratio.

* * * * *